Dec. 30, 1952  LE CONIE STILES  2,623,480
ART OF PRODUCING BUTTER-HORNS
Filed Nov. 13, 1945  3 Sheets-Sheet 1

INVENTOR.
Le Conie Stiles
BY
Edward Brown
ATTORNEY.

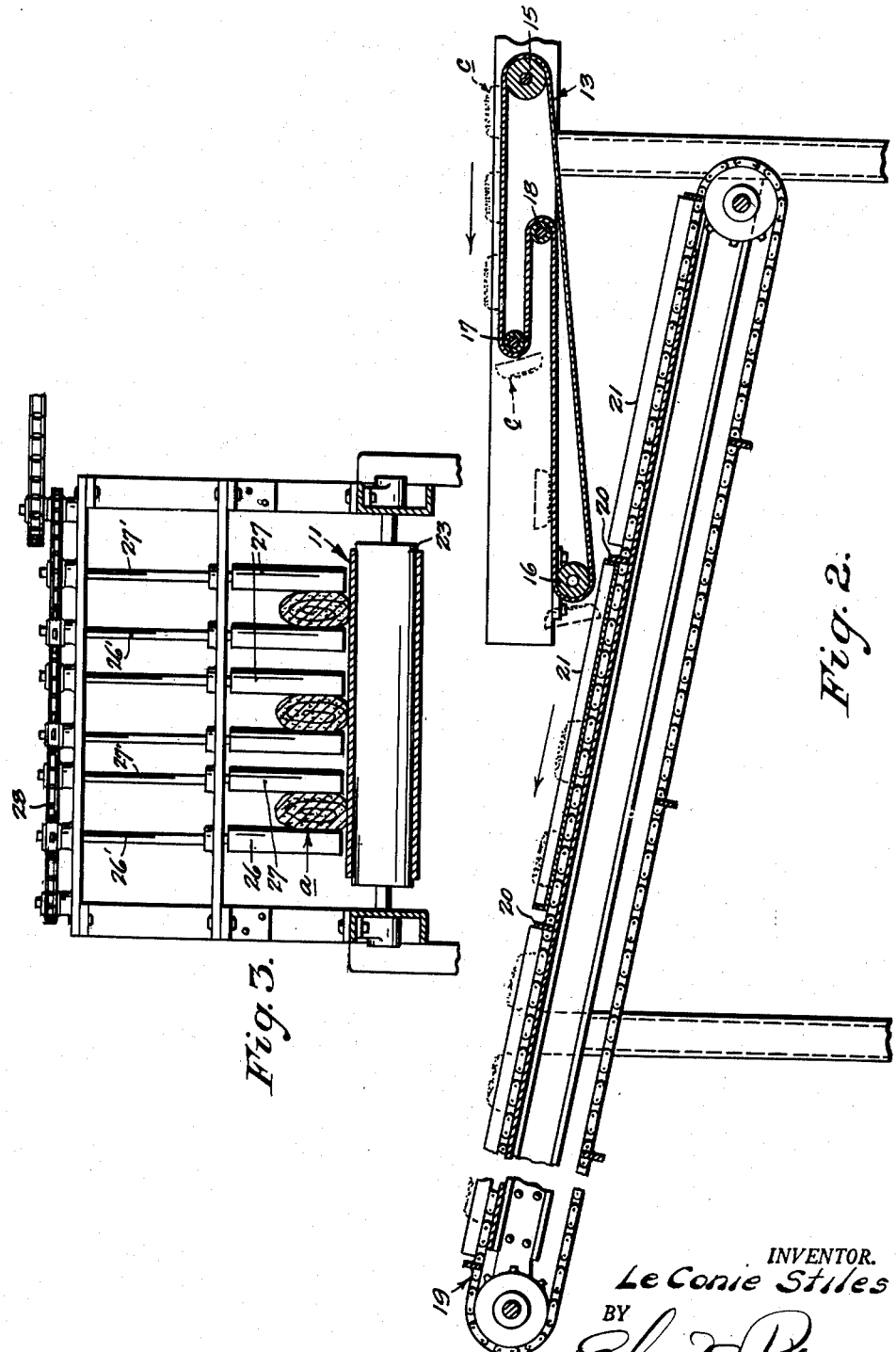

Dec. 30, 1952  LE CONIE STILES  2,623,480
ART OF PRODUCING BUTTER-HORNS
Filed Nov. 13, 1945  3 Sheets-Sheet 3
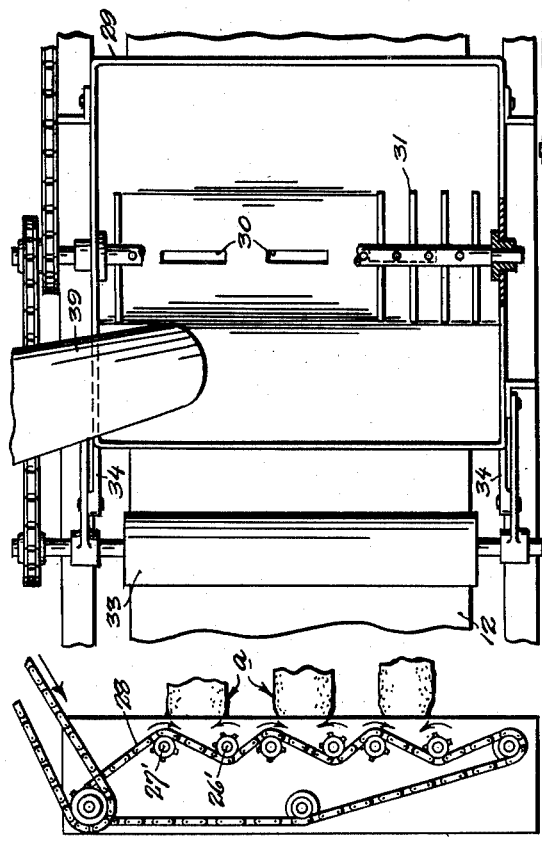
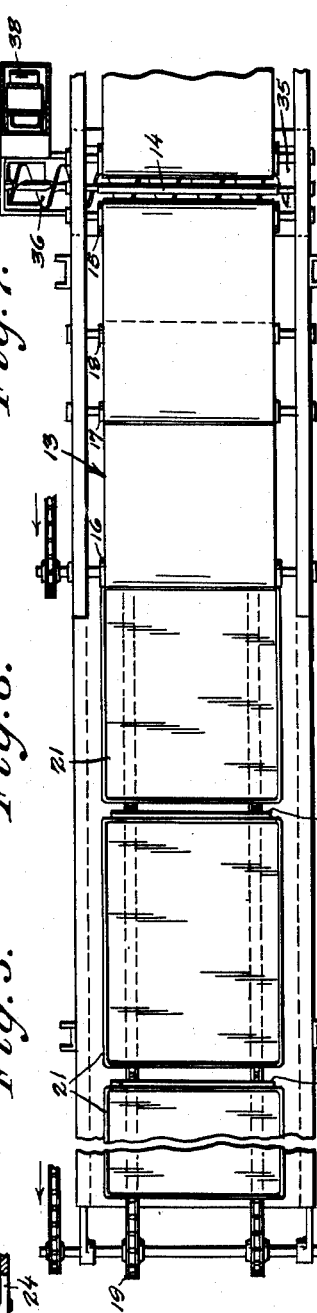
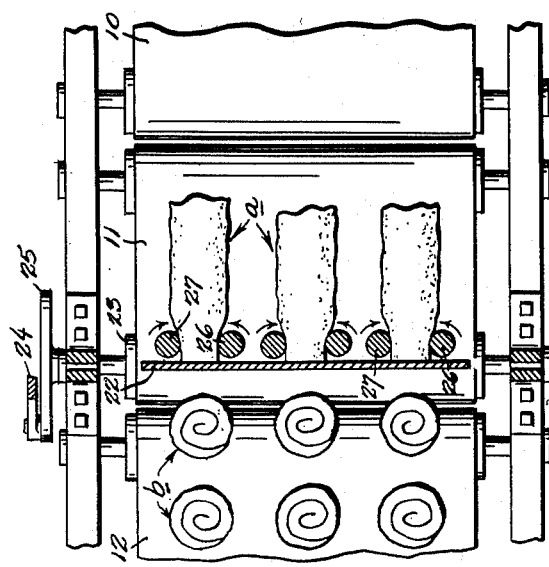
INVENTOR.
Le Conie Stiles
BY
ATTORNEY.

Patented Dec. 30, 1952

2,623,480

UNITED STATES PATENT OFFICE 2,623,480

ART OF PRODUCING BUTTER-HORNS

Le Conie Stiles, Seattle, Wash.

Application November 13, 1945, Serial No. 628,103

7 Claims. (Cl. 107—54)

This invention relates to a machine and method for the production of coffee cakes, and especially pertains to the production of that type of coffee cake known as a butter-horn, namely a product of the bakery art comprised of a spirally-rolled strip of dough and which is coated upon the upper side by an icing mixture commonly termed "streusel" consisting of crushed nuts, spices, and powdered sugar.

There have been heretofore devised several machines by the use of which it was proposed to mechanize the steps of producing butter-horns, and of these several prior developments undoubtedly the most successful is a machine of my own conception illustrated and described in U. S. Letters Patent No. 2,345,637, issued April 4, 1944. This patented machine acts upon an elongated rolled body of sheeted dough, first conveying the same upon a feed belt to a reciprocating knife which operates to cut the dough body transversely at closely spaced intervals of the length, and thence conveying the successive dough slices and depositing the same upon a revolving table which is coated with a mixture of the "streusel" topping. Operators, in this previously devised machine, then removed the dough slices from the table by hand—with the "streusel" adhering to the underside of the slices—and placed the same right side up in pans, usually nine slices to a pan. The pans were then placed in the oven for baking. While this machine has met with considerable favor, and understandably so when it is appreciated that the same has an established single-line hourly output of 900 dozen butter-horns, it became quite apparent to me that the machine, at least in so far as its slicing function was concerned, could be accelerated so as to turn out a considerably higher number of dough slices. I appreciated, however, that this increase in slicing capacity would have no practical value unless it were possible to eliminate hand labor in performing the steps of applying the coating of "streusel" and transferring the coated slices from the "streusel" bed to the baking pans. In substance and otherwise stated, this is to say that, where the slices are individually processed by hand at any stage of their treatment, the practical ceiling speed for slicing is determined by the speed of manual handling. It is one object of the present invention to accomplish this desirable end, namely that of eliminating the manual handling of any individual slices and expressly mechanizing the processing of the dough slices from the moment at which the elongated roll of sheeted dough is delivered onto the conveyor belt, through and including a depositing of the "streusel"-topped slices into the baking pans.

In clarifying an additional advantage of the present invention, it may be here stated that my prior machine had this further objection, and that is a tendency of the knife—which works against a cushion roll—to flatten the dough body as it cuts through the latter, and in consequence produce a slice of a double convex form. To return this slice to the desired annular form, I initially relied upon hand labor to "pat" the two side edges of the slices inwardly as each successive slice travelled on the conveyor to the "streusel" table, and I later engineered a mechanism comprised of two oppositely-acting paddle arms moving transversely in a horizontal plane to substantially reproduce the hand movement. The present invention proposes to obviate any need for a re-shaping of the dough slices either by hand or mechanically, and which said end is accomplished by providing a means which acts to sustain the dough body and hold the same against being flattened as the knife works through the dough.

As a still further object, the invention aims to produce a machine which sprinkles "streusel" from an overhead point upon the top of the dough slices as the latter proceed from the knife, and as distinguished from my previous reversed procedure of dropping the slices from an elevated point into a moving bed of the "streusel," and further to provide a means which will press this top-coating into the travelling slices in order that the icing mixture will be made to adhere to the slices.

The invention has the still further object of segregating, from the traveling slices, such excess "streusel" as may have been sprinkled upon the conveyor, and to give continuing travel to the slices while collecting this excess "streusel" and returning the same to the overhead sprinkling agency.

The invention has the further object still of providing a machine which drops the iced slices from an elevated point of discharge into the receiving pans, and in effecting this drop to cause the slices to be deposited right side up, and which is to say with the icing mixture uppermost.

Other and still more particular objects of the invention will, with the foregoing, appear and be understood in the course of the following description and claims, the invention consisting in the new method of producing butter-horns and in the novel construction and the adaptation and combination of parts of a machine for practicing said method, hereinafter described and claimed.

In the accompanying drawings:

Figures 1 and 2 are each a longitudinal vertical section and which, taken together, fragmentarily portray a machine constructed in accordance with the now preferred embodiment of the invention, dotted lines being used in these views to indicate the dough body and the slices produced therefrom.

Figure 3 is a fragmentary transverse vertical section taken to an enlarged scale on line 3—3 of Figure 1, and with the spirally-rolled dough body here shown by full lines.

Figure 4 is a reduced-scale fragmentary top plan view of the tail end of the machine, and which is to say that part of the machine which includes a transverse gutter for collecting excess "streusel," a discharge belt which carries therebeyond, and a pan-carrying conveyor lying below the tail end of the discharge belt.

Figure 5 is a fragmentary horizontal sectional view on line 5—5 of Figure 1, using the scale of Figure 3, and indicating by full lines the spirally-rolled dough bodies and the produced slices.

Figure 6 is a fragmentary top plan view detailing the drive arrangement for multiple pinching rolls which act to sustain the dough bodies against becoming flattened as the knife performs its slicing function; and Figure 7 is a fragmentary top plan view detailing the hopper and associated parts by which "streusel" is delivered upon the upper surface of the travelling dough slices.

Figure 1:
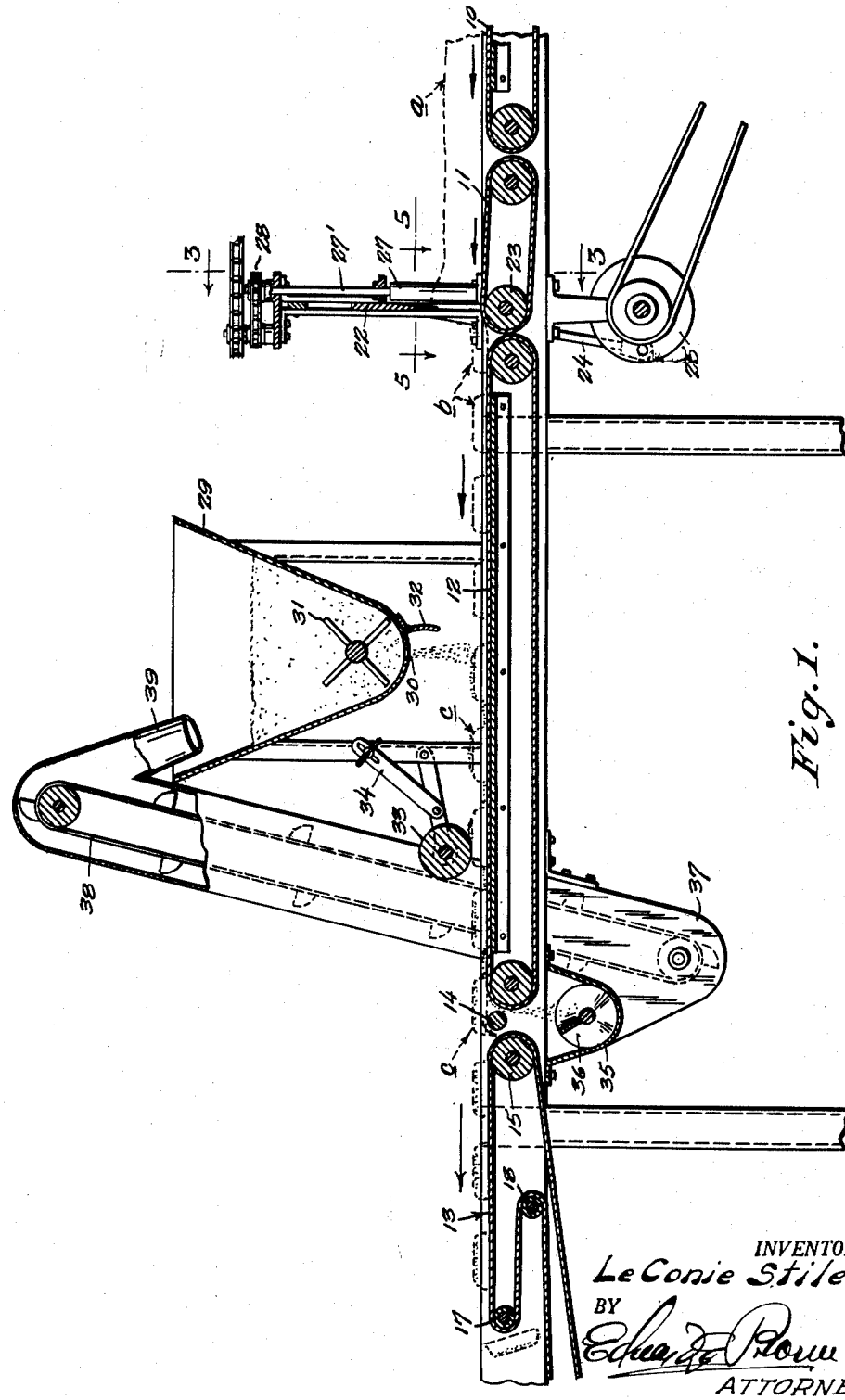

Referring to said drawings, the numerals 10, 11, 12, and 13 denote four endless conveyor belts which I will hereinafter term the supply, cutting, icing and discharge belts, respectively. The function of the supply belt is to convey the work—comprised of an elongated spirally rolled body of sheeted dough—to the cutting belt on which, as the name signifies, the dough body is cut transversely at spaced intervals of the length into multiple slices. This cutting is performed at the tail end of the belt, and the slices feed therefrom onto the icing belt. In course of movement with the icing belt, the "streusel" mixture is sprinkled upon the top surface of the travelling slices, and the slices then are delivered to the discharge belt. There is provided between the tail end of the icing belt and the head end of the discharge belt a gap, and this gap, which is employed for a purpose to be hereinafter described, is occupied in part by a live roller 14 serving the purpose of a transfer shelf supporting the slices in their intended movement from the icing belt to the head end of the discharge belt.

For carrying the discharge belt there are provided four rollers comprised of a head roller 15, a tail roller 16, and two secondary rollers 17 and 18 placed to occupy staggered positions between the two principal rollers and with the upper said secondary lying in closer proximity to the tail roller than does the lower said secondary roller. The belt provides an upper-level run by first carrying from the head roller 15 to and about the secondary roller 17, thence returning to the lower secondary 18, and then providing a lower-level run by carrying to and about the tail roller 16. Lying in spaced relation below and arranged to extend beyond the tail end of the discharge belt is an endless conveyor chain 19 fitted at spaced intervals of the length with flights 20, and arranged to be engaged by these flights are baking pans 21.

In powering the several belts 10, 11, 12, and 13, the live roller 14, and the conveyor chain 19, and whose directional course is indicated by arrows, chains or an equivalent driving means are employed, the driving arrangement being such as to correlate the speed of one said part with the speed of another and this said correlation, where butter-horns are being produced, is such as will give to the icing belt a travelling speed accelerated over that of the supply belt in a degree sufficient to compensate for the increased space necessarily taken by the slice when lying upon its side rather than on edge. In actual practice, it is desirable that the successively delivered slices be spaced apart upon the icing and discharge belts, and hence the degree of acceleration is more pronounced than the actual relation existing between the diameter and the width of a slice.

In performing the slicing action, I employ a knife 22 which is mounted for reciprocatory vertical movement above the tail roller 23 of the cutting belt. Such tail roller is composed of neoprene or relatively soft rubber to accomplish a slight cushioning of the knife's thrust as the same works in its down or cutting stroke of reciprocation into contacting engagement with the belt 11. The drive to the knife is comprised of connecting rods 24—one at each side of the machine—crank-operated from driving wheels 25.

Considering said cutting operation in more particularity, it will be self-evident that the knife's down stroke of reciprocation tends to flatten the dough body $a$ as it cuts through the latter, and to counteract this tendency I cause the rolled dough body to pass between and be sustained by a pair of live pinching rollers, as 26 and 27, spaced transversely one from the other a distance somewhat less than the diameter of the dough body, hence forcing the dough body as it passes therebetween to assume, sectionally considered, much the form of a section of an ellipsoid of which the major diameter stands erect. These rollers occupy a position above the cutting belt immediately in front of the knife and are carried by spindles 26'—27' which are journaled from above for revoluble movement about vertical axes. In the machine, as it is now designed, there are three sets of these pinching rollers located in laterally spaced relation, hence accommodating the machine to three separate production lines. To drive the several rollers an overhead chain 28 is used, and the arrangement is one in which the two rollers of a set act in converse directions of rotation working the dough body toward the knife and at a perimeter speed corresponding to the travel of the cutting belt.

Now proceeding beyond the cutting stage, the lines of work—now in the form of untopped slices denoted $b$—are caused to travel below a hopper 29 containing a "streusel" mixture. In the base of the hopper are discharge slots 30 vertically aligned with the respective work lines, and received in the hopper and serving to assure a constant sprinkle-delivery of "streusel" through these slots is a power-driven agitator 31. 32 denotes a manually controlled closure gate for the slots.

Travelling beyond the sprinkling stage, the iced slices $c$ are brought under the influence of a pressure roll 33 driven in a direction and at a speed corresponding to that of the moving lines of slices, and by the action of this roller the coating of "streusel" is pressed into the dough and the slices themselves are spread into a somewhat expanded compass, provision being made by means such as the indicated adjustment arm 34 for governing the depth of the throat described between the roller 33 and the belt 12.

It will be apparent that only a portion of the "streusel" mixture which is delivered from the hopper will adhere as a coating to the dough slices, and that the remainder will fall upon the belt 12 and be carried the length of the latter. This residue of "streusel" thus finds its way to the gap which lies between the tail end of belt 12 and the live roller 14, and dropping through the gap falls into a subjacent gutter 35. A feed screw or worm 36 is received in this gutter and connects by its discharge end with the boot 37 of a bucket elevator 38 which lies to one side of the belt 12, and from the head end of this elevator there is provided a return chute 39 feeding into the hopper.

The slices leaving the icing belt are now in condition to be placed in pans and introduced to the baking oven, but it must be appreciated that were the slices—having the applied icing uppermost—to be dropped by gravity directly into the pan, the resulting 180° or thereabouts turn of the slices as the same pass over the tail roller of a single-level discharge belt would cause the icing to lie upon the underside of the panned slices. It is in appreciation of this resulting half-flip that I have designed my machine with a two-level discharge belt, the slices being first turned upside down as the same drop from the upper to the lower level and then being again turned right side up as the same drop from the end of the lower level into the pans. The pans are applied to and removed from the conveyor chain by hand, but it is quite feasible, if the same should be desired, to perform one or both of these steps mechanically.

It is thought that the nature of the invention, and the manner of its use, will be clear from the foregoing. Departures from the embodiment which I have elected to illustrate will suggest themselves, and no limitations are to be implied from the foregoing description having express reference thereto, it being my intention that all forms of construction and variations in detail coming within the scope of the hereto annexed claims are to be considered as comprehended by the invention.

What I claim, is:

1. The method of making circular cake-slices which comprises the steps of feeding an elongated dough body of a generally circular outline, sectionally considered, along a predetermined path, subjecting opposite sides of said advancing dough body to pressure to deform it to a generally elliptical outline, and in immediate following relation to the point at which said pressure is applied slicing the advancing dough body at spaced intervals of its length by cutting through the same with a chopping movement directed approximately at right angles to the direction of said applied pressure so that the flattening action of the cutting force causes the resulting cake-slices to resume a circular shape.

2. The method of cutting generally circular cake-slices from an elongated dough body and which comprises forming the dough body to a generally elliptical outline, sectionally considered, and then slicing it at spaced intervals of its length in the direction of its major axis so that the flattening action of the slicing force causes the resulting cake-slices to assume a circular shape.

3. The method of cutting cake-slices of a predetermined shape from an elongated dough body and which comprises forming the dough body to a cross-sectional shape having a longer dimension in one direction and a correspondingly shorter dimension in a direction at right angles thereto than the two corresponding dimensions of the said predetermined shape, and then slicing the dough body transversely at spaced intervals of its length in the direction of said increased dimension so that the flattening action of the slicing force causes the resulting cake-slices to assume said predetermined shape.

4. A machine for making circular cake-slices from an elongated body of dough having a generally circular cross-section and comprising: means for feeding the dough body along a predetermined path, pressure means along said path for subjecting opposite sides of the dough body to opposing pressures to deform the leading end thereof to a generally elliptical cross-section, and means movably mounted so as to slice the advancing dough body as it moves beyond said pressure means, said slicing means being disposed in immediate following relation to the pressure means and having its direction of movement along the major axis of the elliptical figure produced by said pressure means, said opposing pressures being such that the elliptical leading end of the dough body resulting therefrom is caused to assume a circular shape by the flattening action of the slicing means while cutting through the dough body.

5. The machine of claim 4 wherein said pressure means comprises a pair of spaced rollers journaled for rotary movement.

6. The machine of claim 4 wherein said pressure means comprises a pair of spaced live rollers driven in directional correspondence with the directive travel of the dough body.

7. In the production of coffee cakes in which an elongated rolled body of dough is conveyed along sliced transversely at spaced intervals of the a predetermined path and in course of its travel length by action of a cutting knife movable reciprocally in a transverse plane normal to the travel path of the rolled dough body, the combination with said knife and with the conveyor of means acting to resist the tendency of the knife to flatten the dough body as the slices are cut therefrom and comprising a pair of complementing rollers arranged to bear one upon one side and the other upon the other side of the advancing dough body to restrain the latter against spreading and journaled for rotation about transversely spaced vertical axes located immediately adjacent the cutting plane of the knife.

LE CONIE STILES.

REFERENCES CITED

The following references are of record in the file of this patent:

UNITED STATES PATENTS

| Number | Name | Date |
|---|---|---|
| 651,618 | Tilden | June 12, 1900 |
| 1,473,289 | Green | Nov. 6, 1923 |
| 1,514,345 | Salerno | Nov. 4, 1924 |
| 1,667,763 | Armstrong | May 1, 1928 |
| 1,801,572 | Salerno | Apr. 21, 1931 |
| 1,816,536 | Joachimson | July 28, 1931 |
| 1,936,893 | Werner et al. | Nov. 28, 1933 |
| 2,345,637 | Stiles | Apr. 4, 1944 |

FOREIGN PATENTS

| Number | Country | Date |
|---|---|---|
| 242,282 | Germany | Jan. 4, 1912 |